(12) United States Patent
Iwasaki et al.

(10) Patent No.: US 8,768,145 B2
(45) Date of Patent: Jul. 1, 2014

(54) CONTENT REPRODUCING APPARATUS, METHOD, AND PROGRAM

(75) Inventors: Takao Iwasaki, Kobe (JP); Keita Sato, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1012 days.

(21) Appl. No.: 12/458,452

(22) Filed: Jul. 13, 2009

(65) Prior Publication Data

US 2010/0008653 A1 Jan. 14, 2010

(30) Foreign Application Priority Data

Jul. 14, 2008 (JP) ................................. 2008-182406

(51) Int. Cl.
*H04N 9/80* (2006.01)
(52) U.S. Cl.
USPC .......................................... 386/248; 386/239
(58) Field of Classification Search
None
See application file for complete search history.

(56) References Cited

U.S. PATENT DOCUMENTS

| | | | |
|---|---|---|---|
| 2006/0120692 A1 | 6/2006 | Fukuta | |
| 2006/0158969 A1* | 7/2006 | Hamada et al. | 369/30.28 |
| 2007/0154179 A1* | 7/2007 | Takeuchi | 386/95 |
| 2007/0226398 A1 | 9/2007 | Kobayashi | |
| 2008/0001240 A1 | 1/2008 | Minamio et al. | |
| 2008/0118232 A1* | 5/2008 | Kakumu et al. | 386/124 |
| 2012/0308207 A1* | 12/2012 | Hamada et al. | 386/248 |

FOREIGN PATENT DOCUMENTS

| | | |
|---|---|---|
| JP | A-09-219086 | 8/1997 |
| JP | A-2004-5106 | 1/2004 |
| JP | A-2005-129093 | 5/2005 |
| JP | A-2006-139846 | 6/2006 |
| JP | A-2006-164327 | 6/2006 |
| JP | A-2007-257714 | 10/2007 |
| JP | A-2008-034787 | 2/2008 |
| JP | A-2009-193642 | 8/2009 |

OTHER PUBLICATIONS

Oct. 16, 2012 Office Action issued in Japanese Patent Application No. 2008-182406 (with partial translation).
Jul. 24, 2012 Notice of Reason for Rejection issued in Japanese Patent Application No. 2008-182406 (with English Translation).

* cited by examiner

*Primary Examiner* — Heather Jones
(74) *Attorney, Agent, or Firm* — Oliff PLC

(57) ABSTRACT

A content reproducing apparatus includes: a content control unit that controls reproduction of a content by reading a program from a BD and executing the program; a reproduction information recording unit that records reproduction information including a reproduction position within the content during the reproduction; a reproduction information acquiring unit that acquires, upon a start of the reproduction of the BD, the reproduction information recorded at a time of previous reproduction; and a resume-reproduction control unit that starts to reproduce the BD from the reproduction position identified based on the acquired reproduction information or from a vicinity thereof, wherein the content control unit controls the reproduction if the reproduction information has not been acquired by the reproduction information acquiring unit, and the resume-reproduction control unit controls the reproduction if the reproduction information has been acquired by the reproduction information acquiring unit.

13 Claims, 11 Drawing Sheets

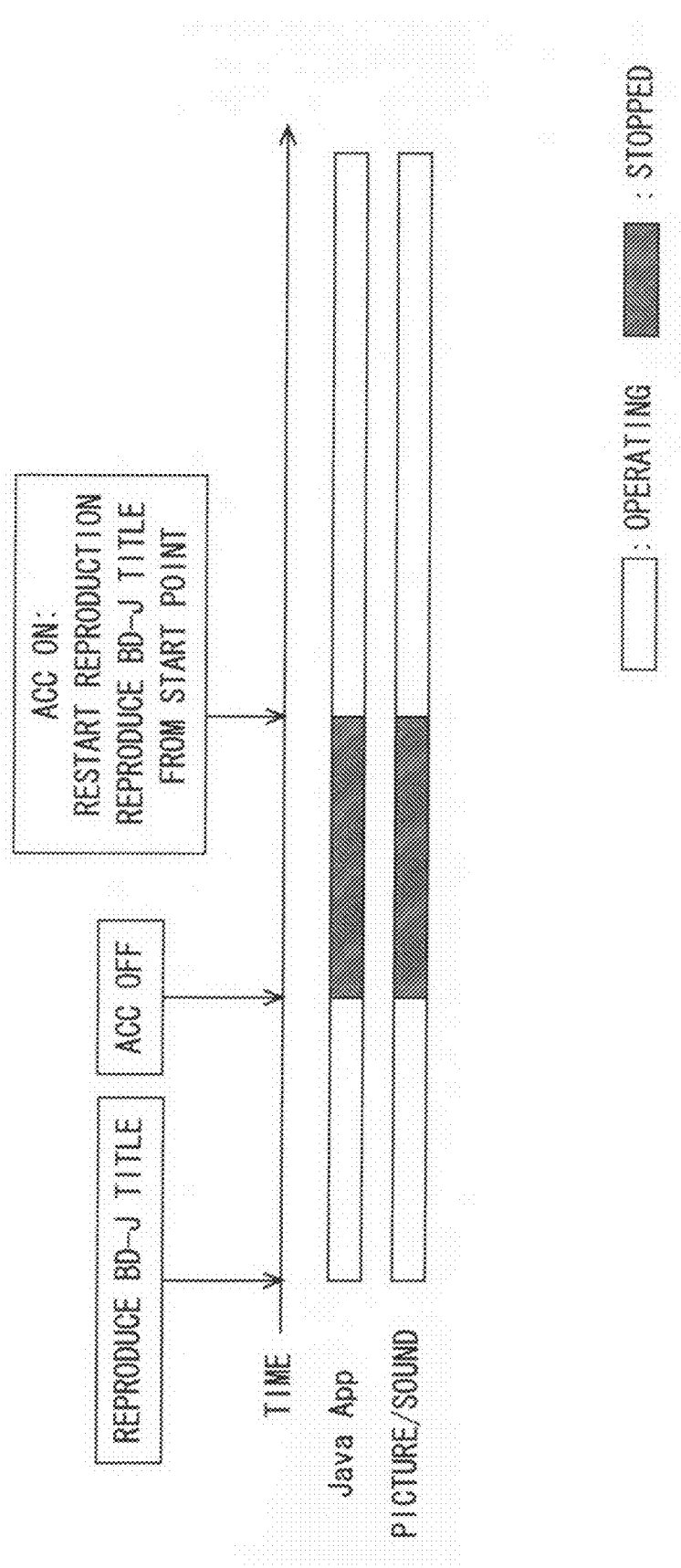

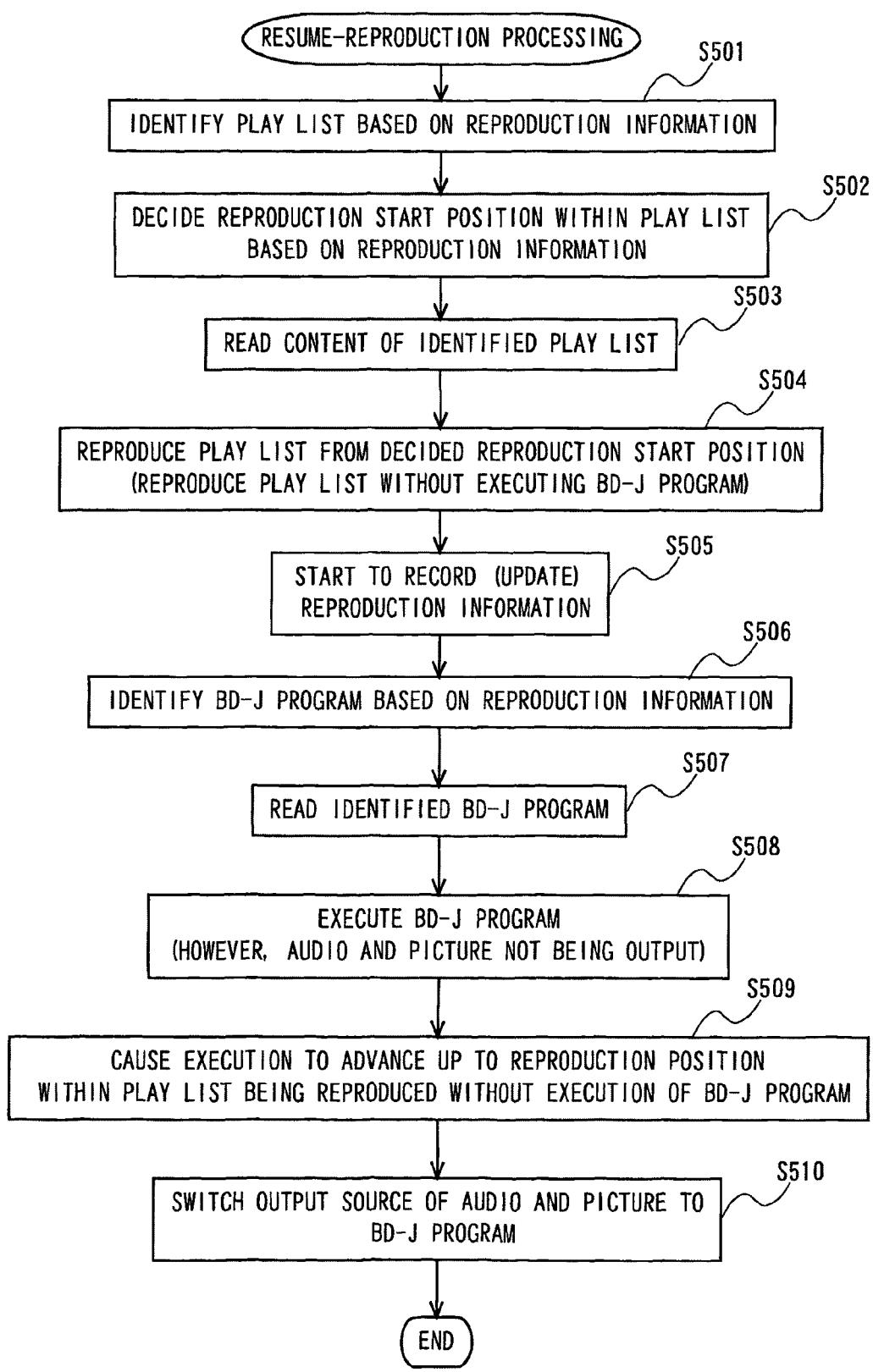

CONTENT REPRODUCING APPARATUS, METHOD, AND PROGRAM

CROSS-REFERENCE TO RELATED APPLICATION

This application is based upon and claims the benefit of priority of the prior Japanese Patent Application No. 2008-182406, filed on Jul. 14, 2008, the entire contents of which are incorporated herein by reference.

FIELD

The present invention relates to a content reproducing apparatus that reproduces a content read from a recording medium.

BACKGROUND

Up to now, there are known: an information reproducing apparatus (see, for example, Patent document 1) in which information on a reproduction position used for resume-reproduction is stored or discarded depending on a content type of a content stored on a disk; a reproducing apparatus (see, for example, Patent document 2) in which a memory is caused to store a reproduction position for an image in order to make a reproduction operation for image data more convenient; and a technology (see, for example, Patent document 3) in which a memory supplied with power even during suspend is caused to retain a program necessary for resume in order to increase a speed of the resume operation.
[Patent document 1] JP 2007-257714 A
[Patent document 2] JP 2006-139846 A
[Patent document 3] JP 2004-5106 A

SUMMARY

Conventionally, an apparatus provided with a function of reproducing a content including a picture and an audio read from a recording medium such as a compact disc (CD) or a digital versatile disc (DVD) is generally provided with a so-called resume-reproduction function of storing a reproduction end position for the CD or the DVD and restarting reproduction from a position in which the previous reproduction was stopped at a time of the subsequent reproduction. The resume-reproduction function has become a general function for a user through a widely available reproduction apparatus for a CD, a DVD, or the like, and the user expects the function to automatically work in the general reproduction apparatus.

Here, there is known a medium, for example, a Blu-ray Disc (registered trademark; hereinafter, referred to as "BD"), which provides contents that are different in control scheme for reproduction even if the contents are of the same type (for example, picture content). More specifically, the BD uses as a control scheme for the content a control scheme of High Definition Movie (HDMV) developed by extending a scheme used for the conventional DVD or Blu-ray Disc Java (registered trademark) (BD-J) using a Java (registered trademark) program. With regard to an HDMV title, the control scheme is an extension of the conventional DVD, and hence by storing an identifier of the content midway through the reproduction, a reproduction position, and the like, it is possible to easily provide the same resume-reproduction function as that provided by the DVD.

However, with regard to a BD-J title, the control scheme is different from the conventional DVD and is a scheme for performing control by executing a BD-J program read from the BD, and hence it is not easy to provide the resume-reproduction function by using the same scheme as the scheme provided by the conventional DVD. More specifically, the BD-J is of the control scheme for executing a program, and once the program is ended, it is necessary to execute the program from a start point thereof at the time of the subsequent reproduction. Therefore, in the reproduction of the BD-J title, unlike the resume-reproduction function provided by a conventional DVD reproducing apparatus, it is impossible to provide the resume-reproduction function by a method of storing the identifier of the content midway through the reproduction, the reproduction position, and the like.

In view of the above-mentioned problems, it is an object of the present invention to provide a so-called resume-reproduction function to an apparatus that controls reproduction of a content read from a recording medium by using a program read from the recording medium.

In order to achieve the above-mentioned object, the present invention makes it possible to provide a so-called resume-reproduction function to an apparatus that controls reproduction of a content read from a recording medium by using a program read from the recording medium, by directly reproducing the content upon resume-reproduction, without executing a content control program executed after being read from the recording medium in order to control the reproduction of the content as a normal reproduction.

Specifically, the present invention is a content reproducing apparatus, which reads a content from a recording medium on which the content and a content control program for controlling reproduction of the content are recorded and reproduces the content, the content reproducing apparatus comprising: a content control unit configured to control the reproduction of the content read from the recording medium by reading the content control program from the recording medium and executing the content control program; a reproduction information recording unit configured to record reproduction information including a reproduction position within the content during the reproduction; a reproduction information acquiring unit configured to acquire, upon a start of the reproduction of the content recorded on the recording medium, the reproduction information recorded by the reproduction information recording unit when the content recorded on the recording medium is previously reproduced; and a resume-reproduction control unit configured to start to reproduce the content recorded on the recording medium from the reproduction position identified based on the reproduction information acquired by the reproduction information acquiring unit or from a vicinity thereof, wherein the content control unit controls the reproduction of the content if the reproduction information has not been acquired by the reproduction information acquiring unit, and the resume-reproduction control unit controls the reproduction of the content if the reproduction information has been acquired by the reproduction information acquiring unit.

Here, the recording medium is preferably a portable recording medium (so-called removable medium) such as a BD, but the present invention may be applied to a non-portable recording medium. Further, examples of the recording medium of a scheme under which the reproduction of the content is controlled by executing the content control program recorded on the recording medium along with the content include a BD, but the present invention can be applied to any recording medium without being limited to the BD as long as the recording medium is of the scheme under which the reproduction of the content is controlled by executing the content control program recorded on the recording medium along with the content.

Further, the content control program is a program for controlling a reproduction sequence or the like in the reproduction of the content, and the content control unit executes the content control program to thereby control the reproduction of the content. The content control program is, for example, a BD-J program for controlling a BD-J title recorded on a BD, and is managed as a process (task) by a central processing unit (CPU) or a program execution environment and controlled by using a variable, a stack, and the like defined inside the program.

Under such a reproduction control scheme, the present invention realizes the so-called resume-reproduction function of restarting the reproduction from a position in which the previous reproduction was stopped. In order to realize such resume-reproduction, according to the present invention, if the reproduction information recorded at a time of previous reproduction has been acquired upon a reproduction start, the content is directly reproduced based on the reproduction information without performing reproduction control using the content control program, by the resume-reproduction control unit.

In other words, according to the present invention, by directly reproducing the content without performing the control using the content control program if the reproduction information is recorded, it is possible to restart the reproduction of the content from the vicinity of the position in which the previous reproduction was stopped on the recording medium for which the reproduction control using the content control program read from the recording medium is originally intended.

Note that in order to keep the reproduction information in proximity to the position in which the reproduction was stopped even at abrupt power shutdown, it is preferable that the reproduction information be regularly recorded at short intervals. The interval for the recording can be set to, for example, 1 second, but the interval to be set in actuality is preferably decided according to processing capabilities of the content reproducing apparatus or a system to which the content reproducing apparatus is provided.

Further, the content reproducing apparatus may be connected to the nonvolatile storage device, and the reproduction information recording unit may record the reproduction information into the nonvolatile storage device. This allows the content reproducing apparatus according to the present invention and the system provided with the content reproducing apparatus to retain the reproduction information to perform the resume-reproduction even when power supply to the content reproducing apparatus or the system has been shut down.

Further, when the content of which the reproduction is controlled by the resume-reproduction control unit reaches an end point, the resume-reproduction control unit may continue the reproduction of the content recorded on the recording medium by starting execution of the content control program read from the recording medium.

In the present invention, when performing the resume-reproduction, the resume-reproduction control unit allows the direct reproduction of the content without executing the content control program, but in this case, after the end of the reproduction of the content first reproduced in the resume-reproduction, the content to be reproduced next is unclear because the control by the content control program has not been performed, and without further processing, the reproduction of the content is brought to an end. Therefore, according to the present invention, the reproduction of the content first reproduced in the resume-reproduction is followed by reading and executing the content control program to thereby continue the reproduction of the content.

Note that the recording medium may be a recording medium on which a plurality of combinations of the content and the content control program for controlling the reproduction of the content are recorded, and when the content of which the reproduction is controlled by the resume-reproduction control unit reaches the end point, the resume-reproduction control unit may continue the reproduction of the content recorded on the recording medium by starting execution of a content control program which is included in the content control programs recorded on the recording medium and which controls a content subsequent to the content that has reached the end point.

In other words, in the present invention, when the content by the resume-reproduction reaches the end point, the content control program for controlling the content subsequent to the content is read and executed. With this, when the reproduction of the content first reproduced in the resume-reproduction is brought to an end, the reproduction control using the normal content control program is thereafter started, which makes it possible to perform the reproduction as intended by a producer of the recording medium.

Further, the content reproducing apparatus may further comprise a setting retaining unit configured to retain setting contents related to the reproduction control for the content. The reproduction information recording unit may record the reproduction information including information that allows identification of the content control program that controls the content during the reproduction. The resume-reproduction control unit may be configured to: start, if predetermined setting information is not retained by the setting retaining unit, to reproduce the content recorded on the recording medium from the reproduction position identified based on the reproduction information or from the vicinity thereof; and cause, if the predetermined setting information is retained by the setting retaining unit, the content control program executed last upon the previous reproduction, which is identified based on the reproduction information, to be read and executed, to thereby cause the reproduction of the content controlled by the content control program to be started from a start point thereof.

If the setting retaining unit retains the predetermined setting information, the resume-reproduction control unit reads and executes the content control program executed at the time of the previous reproduction upon the start of the reproduction to thereby start the resume-reproduction from a position that allows the control using the content control program to be started, the position immediately preceding the position in which the reproduction was ended upon the previous reproduction. In other words, the content reproducing apparatus according to the present invention performs the resume-reproduction by one of two kinds of method of the resume-reproduction method that does not involve the execution of the content control program and the resume-reproduction method that involves the execution of the content control program. Here, which content control unit for resume-reproduction is to be used to perform the resume-reproduction depends upon the contents of the setting retained by the setting retaining unit.

Further, the content reproducing apparatus according to the present invention may further comprise a user's selection receiving unit configured to receive a selection made by a user under a scheme for resume-reproduction control by the resume-reproduction control unit, and the setting retaining unit may retain the predetermined setting information if the user's selection receiving unit receives the selection under a resume scheme using the content control program.

By performing the setting according to the user's selection received by the user's selection receiving unit and referencing the setting contents upon the resume-reproduction, it is possible to allow the user to select which one of the two kinds of resume-reproduction method is to be used to perform the resume-reproduction.

Further, as a method of deciding which one of the two kinds of method of the resume-reproduction method that does not involve the execution of the content control program and the resume-reproduction method that involves the execution of the content control program is to be used for the resume-reproduction, a method of making a decision according to the kind of the content may be employed in addition to the method that allows the user to perform the setting. In other words, the content reproducing apparatus according to the present invention may further comprise a judgment unit configured to judge whether or not the content is an interactive-type content, and the setting retaining unit may retain the predetermined setting information if the judgment unit judges that the content is the interactive-type content.

Here, the interactive-type content is an interaction-based content with which how the content is reproduced varies flexibly depending upon the user's operation, and is different from a movie-type content that is reproduced in a predetermined sequence. With such a content, control contents for the content are often more complicated than those for the movie type, and hence even if the reproduction position in which the reproduction was last performed can be learned from the reproduction information, reproducibility of a state of the previous reproduction may be lowered only by directly reproducing the content from the position in which the reproduction was last performed. Therefore, with regard to the interactive-type content, the content control program that was executed last may be executed by causing the resume-reproduction to be performed by the resume-reproduction method that involves the content control program instead of the resume-reproduction method that does not involve the content control program, and the resume-reproduction higher in reproducibility may be performed.

Further, the reproduction information recording unit may record the reproduction information including information that allows identification of the content control program that controls the content during the reproduction, and the resume-reproduction control unit may start to execute the content control program executed last upon the previous reproduction, which is identified based on the reproduction information, and to reproduce the content recorded on the recording medium from the reproduction position identified based on the reproduction information or from the vicinity thereof, and at a time point when the reproduction position within the content of which the reproduction has been started is overtaken by an execution position within the content control program, may cause the content control program to start to control the reproduction of the content.

In other words, in the present invention, the resume-reproduction for directly reproducing the content without performing the control using the content control program is started, and at the same time, the execution of the content control program is started. Then, at the time point when the reproduction position within the content that is being directly reproduced is overtaken by the execution position within the content control program, the reproduction control for the content is started by the content control program. This makes it possible to instantaneously provide the user with the resume-reproduction, and after the reproduction control for the content is switched to the reproduction control by the content control program, to perform the normal content reproduction as intended by the producer of the content.

Note that the present invention can be grasped also as the content reproducing apparatus provided with the resume scheme using the content control program instead of the resume scheme that does not involve the content control program. In other words, the present invention may be a content reproducing apparatus, which reads a content from a recording medium on which the content and a content control program for controlling reproduction of the content are recorded and reproduces the content, the content reproducing apparatus comprising: a content control unit configured to control the reproduction of the content read from the recording medium by reading the content control program from the recording medium and executing the content control program; a reproduction information recording unit configured to record reproduction information including information that allows identification of the content control program that controls the content during the reproduction; a reproduction information acquiring unit configured to acquire, upon a start of the reproduction of the content recorded on the recording medium, the reproduction information recorded by the reproduction information recording unit when the content recorded on the recording medium is previously reproduced; and a resume-reproduction control unit configured to start to reproduce the content controlled by the content control program from a start point thereof by reading and executing the content control program executed last upon the previous reproduction, which is identified based on the reproduction information acquired by the reproduction information acquiring unit, wherein the content control unit controls the reproduction of the content if the reproduction information has not been acquired by the reproduction information acquiring unit, and the resume-reproduction control unit controls the reproduction of the content if the reproduction information has been acquired by the reproduction information acquiring unit.

The resume-reproduction control unit reads and executes the content control program executed at the time of the previous reproduction upon the start of the reproduction to thereby start the resume-reproduction from a position that allows the control using the content control program to be started, the position immediately preceding the position in which the reproduction was ended upon the previous reproduction. By performing such a resume-reproduction processing, according to the present invention, it becomes possible to appropriately perform the resume-reproduction even if the recording medium includes the interactive-type content or other such content that the contents of the control by the content control program are complicated and correct control thereof is hard to perform without executing the content control program.

Further, the content reproducing apparatus according to the present invention may further comprise a setting retaining unit configured to retain setting information related to the reproduction control for the content. The reproduction information recording unit may record the reproduction information including a reproduction position within the content during the reproduction, and the resume-reproduction control unit may start to reproduce the content recorded on the recording medium from the reproduction position identified based on the reproduction information or from the vicinity thereof if the setting retaining unit does not retain predetermined setting information, and if the setting retaining unit retains the predetermined setting information, may read and execute the content control program executed last upon the previous reproduction, which is identified based on the reproduction information, to thereby start to reproduce the content controlled by the content control program from a start point thereof.

The content reproducing apparatus according to the present invention performs the resume-reproduction by one of two kinds of method of the resume-reproduction method that does not involve the execution of the content control program and the resume-reproduction method that involves the execution of the content control program. Here, which content control unit for resume-reproduction is to be used to perform the resume-reproduction depends upon the contents of the setting retained by the setting retaining unit.

Further, the content reproducing apparatus may be connected to a nonvolatile storage device, and the reproduction information recording unit may record the reproduction information into the nonvolatile storage device. This allows the content reproducing apparatus according to the present invention and the system provided with the content reproducing apparatus to retain the reproduction information and to perform the resume-reproduction even when power supply to the content reproducing apparatus or the system has been shut down.

Further, the present invention can be grasped also as the invention related to a content reproducing control method, a control program, and a computer-readable recording medium recorded with the control program. For example, the present invention may be a content reproducing method, which causes a content reproducing apparatus which reads a content from a recording medium on which the content and a content control program for controlling reproduction of the content are recorded and reproduces the content, to execute: a content control step of controlling the reproduction of the content read from the recording medium by reading the content control program from the recording medium and executing the content control program; a reproduction information recording step of recording reproduction information including a reproduction position within the content during the reproduction; a reproduction information acquiring step of acquiring, upon a start of the reproduction of the content recorded on the recording medium, the reproduction information recorded in the reproduction information recording step when the content recorded on the recording medium is previously reproduced; and a resume-reproduction control step of starting to reproduce the content recorded on the recording medium from the reproduction position identified based on the reproduction information acquired in the reproduction information acquiring step or from a vicinity thereof, wherein the content control step includes controlling the reproduction of the content if the reproduction information has not been acquired in the reproduction information acquiring step, and the resume-reproduction control step includes controlling the reproduction of the content if the reproduction information has been acquired in the reproduction information acquiring step.

According to the present invention, it becomes possible to provide the so-called resume-reproduction function to the apparatus that controls the reproduction of the content read from the recording medium by using the program read from the recording medium.

BRIEF DESCRIPTION OF THE DRAWINGS

FIG. 10 is a diagram illustrating operation states of the Java (registered trademark) application and the picture/sound in the case where the resume-reproduction is performed in the embodiment.

FIG. 11 is a flowchart illustrating a flow of the resume-reproduction processing that can be executed instead of the resume-reproduction processing illustrated in FIG. 6 or 9 within the flow of the BD-J title reproduction processing according to the embodiment.

DESCRIPTION OF EMBODIMENTS

Figure 1:
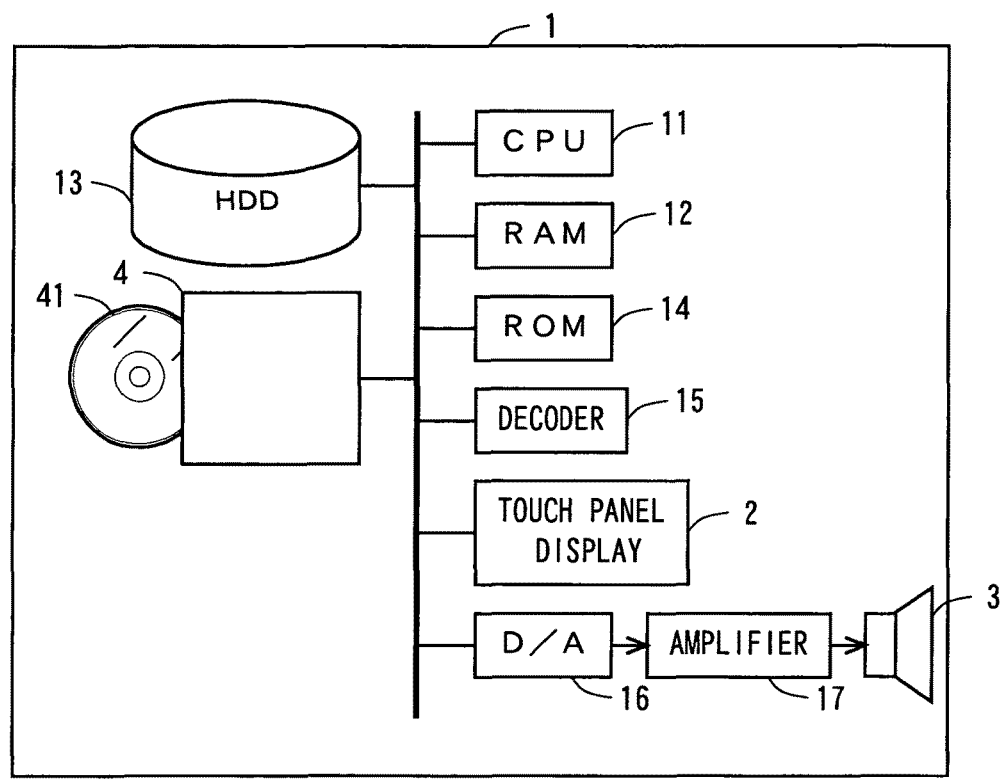
FIG. 1 is a diagram illustrating an outline of a hardware configuration of a content reproducing system according to an embodiment.

Hereinafter, description is made of a content reproducing system provided with a content reproducing apparatus according to an embodiment of the present invention by referring to the drawings. The content reproducing system according to the embodiment may be used as content reproducing systems installed indoors and outdoors for their use and used for other various purposes including an on-vehicle device and a mobile terminal.

FIG. 1 is a diagram illustrating an outline of a hardware configuration of the content reproducing system according to the embodiment. The content reproducing system 1 according to the embodiment includes a random access memory (RAM) 12, a read only memory (ROM) 14, a central processing unit (CPU) 11 that controls an entire system by processing commands and data developed in the RAM 12 or the like, a hard disk drive (HDD) 13 on which various items of data used by the system such as various programs loaded into the RAM 12 are stored, a decoder 15, a D/A converter 16 that converts a digital signal transferred from the decoder 15 into an analog signal, an amplifier 17, a touch panel display 2, a speaker 3, and a multi drive 4, which are electrically connected to one another via a bus or the like.

The multi drive 4 is an optical disk drive on which disks (recording media) of a plurality of standards can be loaded and read. In the system according to the embodiment, information read from the disk such as a BD 41 loaded on the multi drive 4 is transmitted to the decoder 15. The decoder 15 generates a picture signal and a sound signal based on the read information. Then, by outputting the picture signal and the sound signal generated by the decoder 15 to the touch panel display 2 and the speaker 3, the content reproducing system 1 performs reproduction of a picture and a sound.

Note that in the embodiment, the picture signal and the sound signal based on the information read from the disk are generated by the decoder 15, which is a so-called digital signal processor (DSP) or the like, but a decoding processing may be performed by the CPU 11 that executes a decoding program developed in the RAM 12 or the like. Further, a processing of the picture signal and a processing of the sound signal based on the information read from the disk may be processed by one processor or may be processed by dedicated processors that are mutually different.

The touch panel display 2, which is an input/output device (user interface) for a user in the system, is controlled by the CPU 11 to thereby display an image for notifying the user of some information, and detects the user's touching operation with respect to an image display portion to thereby receive the user's operation. Note that the content reproducing system 1 receives the user's operation also through various buttons or the like (not shown) provided to the system 1 in addition to the touching operation with respect to the touch panel display 2. The contents input via the touch panel display 2, the buttons, and the like are recorded in the RAM 12, and processed by the CPU 11. Further, a notification or the like sent to the user by the system may be output in the sound format via the speaker 3.

Figure 2:
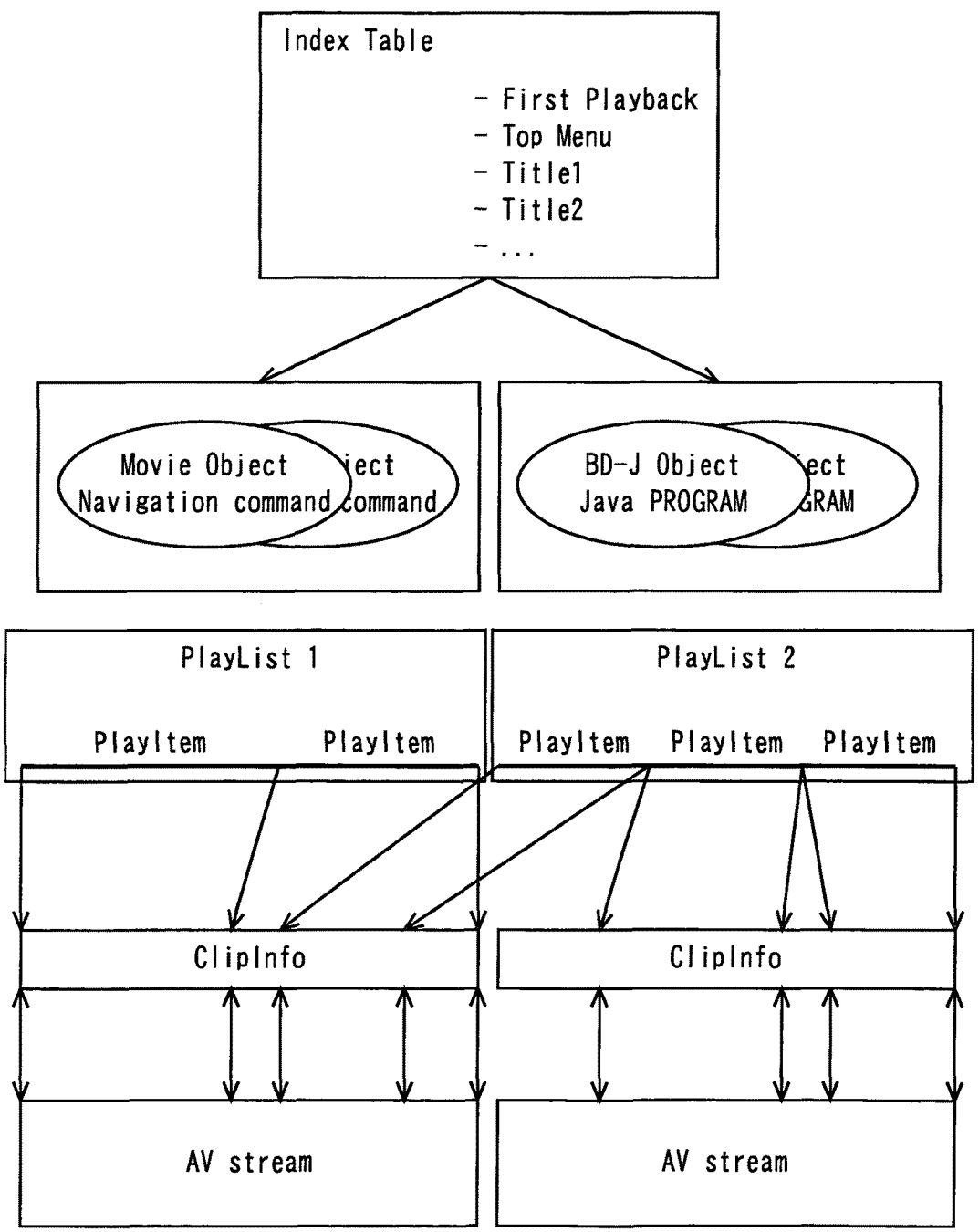
FIG. 2 is a diagram illustrating a data structure of a BD according to the embodiment.

FIG. 2 is a diagram illustrating a data structure of the BD according to the embodiment. Recorded on the BD are: an Index table that is a list of 1 or a plurality of titles (here, "title" is a unit representing a group of contents) contained in the disk; Movie Objects for controlling the reproduction contents of the HDMV title; BD-J Objects for controlling the reproduction contents of the BD-J title; PlayLists operated from the BD-J Objects; PlayItems aligned in a reproduction sequence within the PlayList; ClipInfos for storing information of stream files referenced by the PlayItems; and AV Streams that are stream files including actual picture, sound data, and the like.

Here, the Index table has the list of titles in formats such as a First Playback, a Top Menu, a Title1, a Title2, and the like includes information indicating which one of the HDMV title and the BD-J title each title is (hereinafter, the information is referred to as "content control scheme identification flag"). A content control unit 23 and a reproduction unit 21 which are described later references the content control scheme identification flag to thereby judge which one of the HDMV title and the BD-J title the title related to the reproduction is.

Then, if the title related to the reproduction is the HDMV title, the Movie Object is selected, and a Navigation Command is used to control the PlayList, the TopMenu, the Title, and the like in a similar manner to a conventional DVD video. Alternatively, if the title related to the reproduction is the BD-J title, the BD-J Object is selected, and a Java (registered trademark) program (corresponding to the content control program of the present invention; hereinbelow, referred to as "BD-J program") included in the BD-J Object is executed to thereby control the PlayList, the TopMenu, the Title, and the like. Note that the BD-J program performs control of the reproduction contents by specifying IDs assigned to the PlayList and the like. Further, there are an interactive-type title and a moving-type title as the BD-J titles, which can be discriminated by referencing the title reproduction type recorded on the BD 41. The interactive-type content is an interaction-based content with which how the content is reproduced varies depending upon the user's operation, and examples thereof include a game with which how the reproduction contents and results vary depending upon the user's operation.

Here, the content reproducing system 1 according to the embodiment provides a so-called resume-reproduction function of restarting the reproduction from the previous reproduction end position or from a vicinity thereof at a time of starting the content upon the reproduction of the DVD or the like. With regard to the HDMV title on the BD 41, the resume-reproduction function is provided by the same method as the conventional DVD. This is because the content control scheme for the HDMV title has been developed by extending the content control scheme for the conventional DVD video to thereby allow the resume-reproduction function to be provided by the same method.

The BD-J title reproduced in the embodiment is controlled by executing the BD-J program recorded on the BD 41 along with the content. More specifically, the BD-J program is managed as a process (task) by an operating system (OS) or an execution environment of the system, is assigned with an execution area, and uses a static, a variable, and the like to advance the processing. Therefore, if the reproduction processing is stopped by the same method as the conventional DVD, the execution area in the RAM 12 for executing the BD-J program is freed, which causes the need to execute the program from the start point upon the subsequent execution, and hence the reproduction cannot be restarted from the previously stopped location.

Here, in order to enable the resume-reproduction of the BD-J title, there is a possible method that enables the resume-reproduction by retaining the contents of the BD-J program developed in the RAM as they are, but with the method, in order to perform the resume-reproduction after the power to the apparatus is temporarily shut down, it becomes necessary to copy all of the contents of the in-execution BD-J program in the RAM to a nonvolatile storage device. However, with the method, in order to back up resume-purpose data related to one BD 41 (contents of the in-execution program), it is necessary to use a relatively large storage area. For example, a size of the area necessary to back up the contents of the in-execution memory is expected to be equal to or larger than 100 Mbytes together with the area necessary to execute the BD-J program. Preparing such a large backup area for each of the BDs to be reproduced necessitates a nonvolatile memory having a large capacity, which causes a problem with costs of parts. In addition, a time necessary to export the data having such a large size to an external nonvolatile storage device cannot be ignored, which can cause such a problem that a time from reception of the user's instruction to end reproduction until actual completion of a reproduction ending processing becomes longer, and such a problem that the backup cannot be made under such a situation as abrupt power shutdown, failing to perform the resume-reproduction.

Therefore, the content reproducing system 1 according to the embodiment allows the resume-reproduction of the BD-J title to be performed by restarting only the PlayList (play list) without executing the BD-J program at the time of restarting the reproduction.

Figure 3:
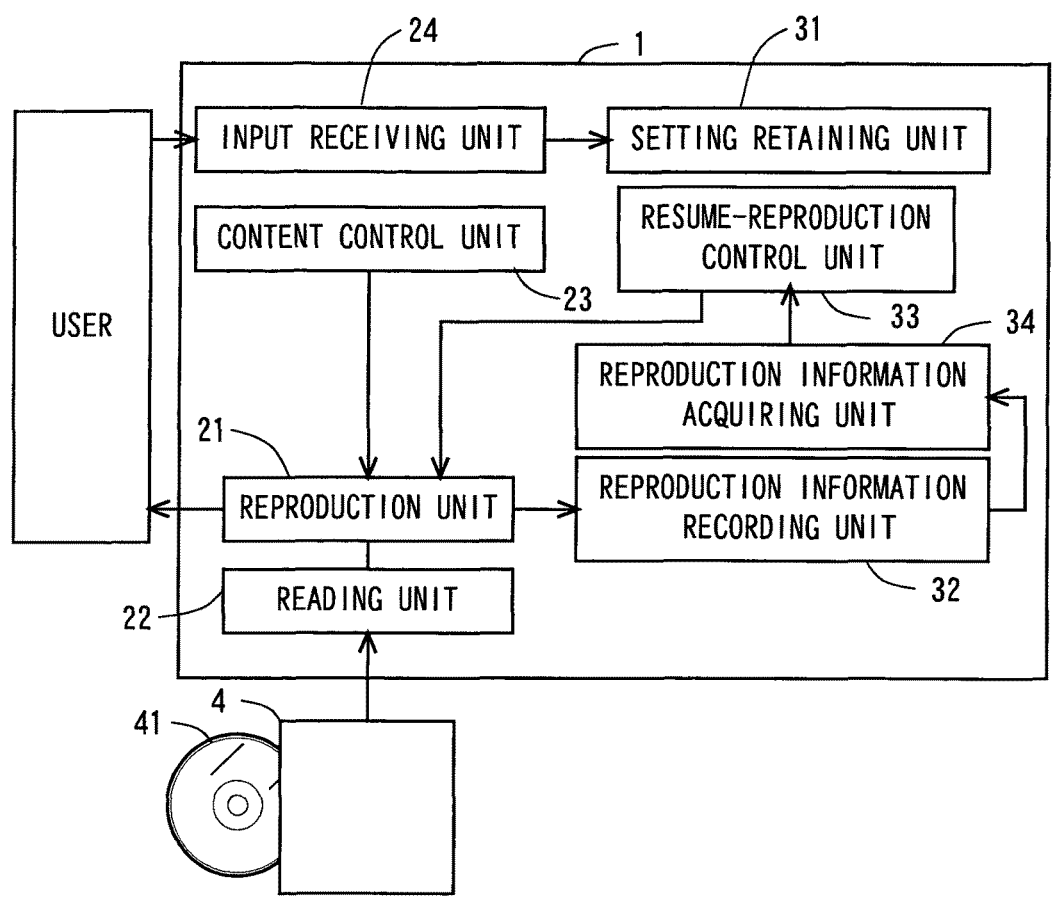
FIG. 3 is a diagram illustrating an outline of a functional configuration of a content reproducing system according to the embodiment.

FIG. 3 is a diagram illustrating an outline of a functional configuration of the content reproducing system 1 according to the embodiment. The system according to the embodiment functions as the content reproducing system 1 including: a reproduction unit 21 that reproduces a content by using the control scheme corresponding to the content by the CPU 11 interpreting and executing a content reproduction program developed in the RAM 12 or the ROM 14; a reading unit 22 that reads from the BD 41 the BD-J program for controlling the reproduction of the BD-J title and the data of the content to be reproduced; a content control unit 23 that controls the reproduction of the content by executing the read BD-J program after being developed in the RAM 12; an input receiving unit 24 that receives the user's input via the touch panel display 2 or the like; a setting retaining unit 31 that retains settings related to the reproduction of the content; a reproduction information recording unit 32 that records the reproduction information including the reproduction position within the content on the HDD 13; a reproduction information acquiring unit 34 that acquires the reproduction information previously accumulated at the time of the reproduction of the content; and a resume-reproduction control unit 33 that performs the resume-reproduction based on the acquired reproduction information and the like.

The reproduction unit 21 and the content control unit 23 reproduces the content by using the control scheme corresponding to the content read from the disk such as the BD 41 by the reading unit 22. In other words, if the content read from the BD 41 is the HDMV title, the reproduction of the content is controlled according to a command of HDMV, and if the content read from the BD 41 is the BD-J title, the BD-J program read from the same BD 41 is executed to control the reproduction of the content. Note that upon the reproduction of the content, the reproduction unit 21 is configured to enable successive reproduction of the HDMV title and the BD-J title. Note that in the embodiment, the content reproducing system 1 references the content control scheme identification flag recorded on the BD 41 to judge which one of the HDMV title and the BD-J title the content of a reproduction subject (content currently being reproduced or to be reproduced hereafter) is.

Further, during the reproduction of the content, the reproduction information recording unit 32 records the reproduction information including the reproduction position within the content periodically (every 1 second in the embodiment). Here, the reproduction information to be recorded includes, for example, information that allows identification of the title, information that allows identification of the play list, and the reproduction position within the play list (more specifically, information representing the reproduction position within the play list by a time in a case where the reproduction is performed at 1× speed from the start point of the play list, being different from an elapsed time after time point when the reproduction is started in the actual reproduction). The reproduction information recorded by the reproduction information recording unit 32 is used as information for deciding a reproduction start position in performing the resume-reproduction. The reproduction information is recorded in a reproduction information table secured on the nonvolatile storage device such as the HDD 13 in association with information (disk identification information) that allows identification of the BD 41 related to the reproduction information to be recorded. In addition, a reproduction information storage area is secured in the reproduction information table for each of the BD 41. Therefore, the reproduction information recording unit 32 can accumulate resume-purpose reproduction information for a plurality of different BDs 41.

With the arrangement, even if the reproduction information is accumulated for the plurality of BDs 41 in the reproduction information table after the reproduction of various BDs 41, the resume-reproduction processing can be performed by using the reproduction information corresponding to the loaded BD 41 at the time of the subsequent reproduction. Further, even if the power to the content reproducing system 1 is shut down, by having the reproduction information recorded on the nonvolatile storage device, the resume-reproduction processing can be performed at the time of the subsequent reproduction.

Then, the thus-accumulated reproduction information is read by the reproduction information acquiring unit 34 at the start of the reproduction of the content, and the resume-reproduction control unit 33 identifies the BD-J title that was being reproduced at a time when the reproduction information was recorded by the reproduction information recording unit 32, the play list, and the reproduction position within the play list, from the reproduction information read by the reproduction information acquiring unit 34. Then, the resume-reproduction control unit 33 decides the reproduction start position based on the identified previous reproduction position and starts the reproduction to thereby perform the resume-reproduction.

Figure 4:
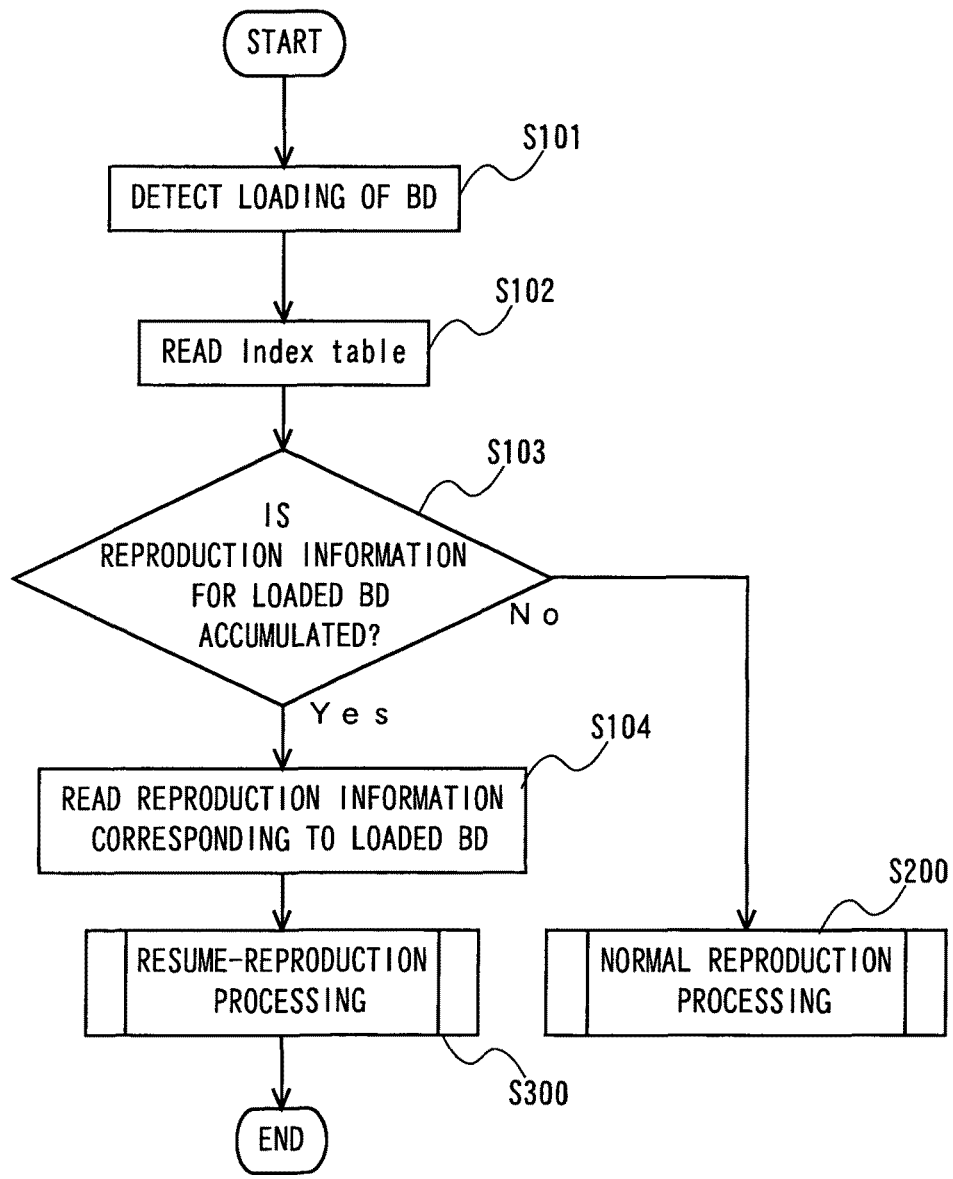
FIG. 4 is a flowchart illustrating an entire flow of a BD-J title reproduction processing according to the embodiment.
Figure 5:
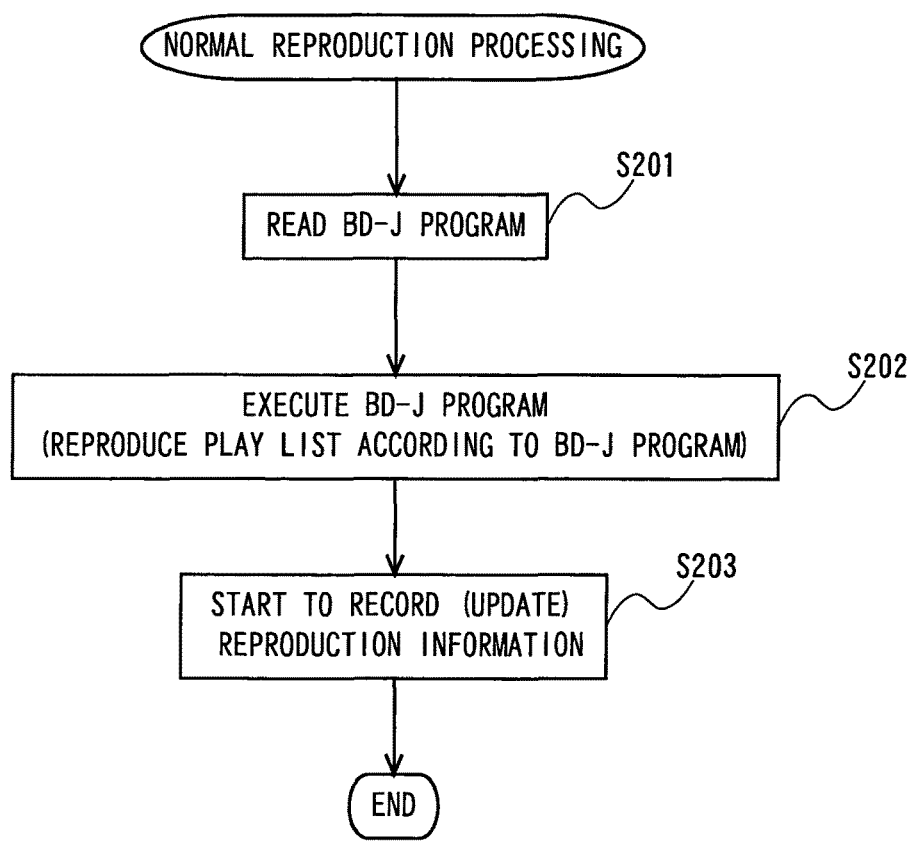
FIG. 5 is a flowchart illustrating a flow of a normal reproduction processing performed in the flow of the BD-J title reproduction processing according to the embodiment.
Figure 6:
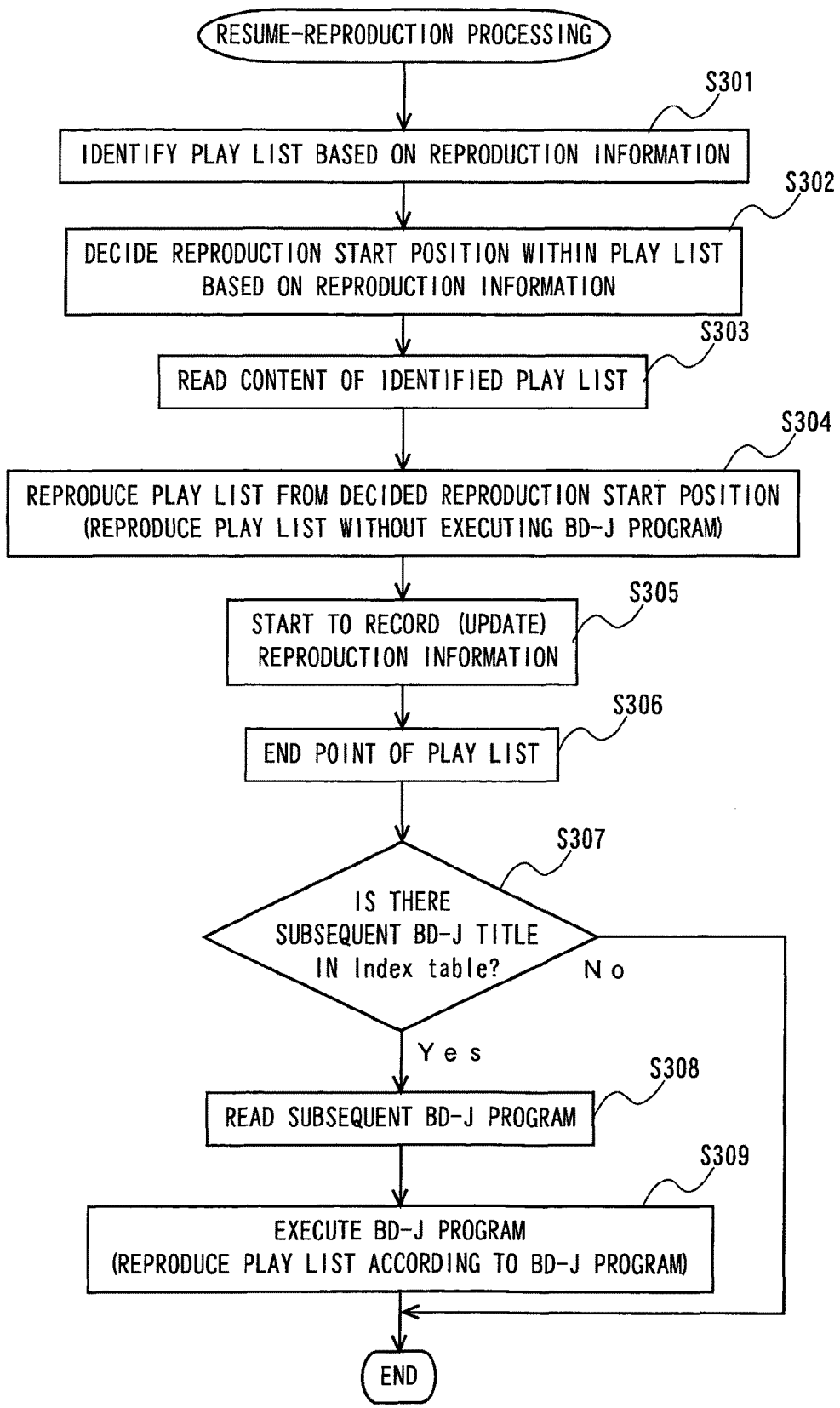
FIG. 6 is a flowchart illustrating a flow of a resume-reproduction processing performed in the flow of the BD-J title reproduction processing according to the embodiment.

Hereinafter, flowcharts illustrated in FIGS. 4 to 6 are used to make detailed description of a recording processing for the reproduction information and the contents of the resume-reproduction processing using the reproduction information. FIG. 4 is a flowchart illustrating an entire flow of a BD-J title reproduction processing according to the embodiment. The processing illustrated in the flowchart is started by such a trigger that the BD 41 is loaded onto the multi drive 4. However, the processing may be started by such a trigger that the content reproducing system is powered on with the BD 41 being loaded on the multi drive 4 or by other such trigger. For example, if the content reproducing system is the on-vehicle device, the processing is started also when an ACC ON operation is performed with the BD 41 being loaded on the multi drive 4.

In Steps S101 and S102, loading of the BD 41 is detected, and the Index table is read from the BD 41. The multi drive 4 detects the loading of the BD 41, and notifies the reading unit 22 to that effect (Step S101). Then, the reading unit 22 reads the Index table including the list of the BD-J titles from the loaded BD 41 (Step S102). After that, the processing advances to Step S103.

In Steps S103 and S104, if the reproduction information corresponding to the loaded BD 41 is recorded, the reproduction information is read. The reproduction information acquiring unit 34 reads from the BD 41 the information (disk identification information) that allows the identification of the BD 41 whose loading has been detected in Step S101, and searches the reproduction information table recorded on the HDD 13 with the identification information as a search key, to thereby judge whether or not the reproduction information corresponding to the loaded BD 41 is recorded therein, in other words, whether or not the BD 41 has ever been reproduced with the information for resume-reproduction recorded at the time being remaining (Step S103). Here, if it is judged that the reproduction information has been recorded, the reproduction information acquiring unit 34 reads the reproduction information retrieved in Step S103 from the reproduction information table to thereby acquire the reproduction information corresponding to the loaded BD 41 (Step S104). If the reproduction information is acquired, then a resume-reproduction processing (Step S300) is started. If it is judged in Step S103 that the reproduction information is not recorded, then a normal reproduction processing (Step S200) is started.

Next, details of a processing performed in the normal reproduction processing (Step S200) are described. Here, the normal reproduction processing is a processing performed in a case where the reproduction information corresponding to the loaded BD 41 is not accumulated, in other words, a case where the loaded BD 41 is reproduced for the first time in the content reproducing system 1. FIG. 5 is a flowchart illustrating a flow of the normal reproduction processing performed in the flow of the BD-J title reproduction processing according to the embodiment.

In Steps S201 and S202, the BD-J program is read, and the execution of the BD-J program is started. The reading unit 22 reads, from the BD 41 whose loading has been detected in Step S101, the BD-J program and the play list (content) whose reproduction is controlled by the BD-J program, followed by development thereof into the RAM 12 (Step S201). Then, the content control unit 23 starts to control the content reproduction by executing the BD-J program developed in the RAM 12 (Step S202). In other words, in the processing illustrated in the flowchart, the resume-reproduction is not performed, and the content recorded on the BD 41 is reproduced according to a normal reproduction procedure for the BD-J title. After that, the processing advances to Step S203.

In Step S203, recording of the reproduction information is started. After a start of the reproduction of the content, the reproduction information recording unit 32 records the reproduction information within the content into the reproduction information table periodically (every 1 second in the embodiment). Here, the reproduction information is recorded by overwriting in the reproduction information storage area prepared in the reproduction information table for each of the BDs 41 every 1 second. By having the reproduction information recorded periodically by the reproduction information recording unit 32, even when the power to the content reproducing system 1 is abruptly shut down, it is possible to grasp a progress of the reproduction at the time of the subsequent reproduction and recover the vicinity of a reproduction end position. After that, the recording of the reproduction information is continued until the reproduction is ended. The reproduction of the content is stopped by receiving, for example, a stop instruction based on the user's stop operation or a disk discharge operation. Note that for the operation that causes the reproduction of the content to be stopped, there are: the stop instruction based on a source switching operation for a case where the content reproducing system 1 is a system that allows a selection of an input source from a TV tuner, an AM/FM tuner, and the like in addition to the multi drive 4; and an ACC OFF operation for the case where the content reproducing system 1 is the on-vehicle device.

Next, details of a processing performed in the resume-reproduction processing (Step S300) are described. Here, the resume-reproduction processing is a processing performed in a case where the reproduction information corresponding to the loaded BD 41 is accumulated, in other words, a case where the loaded BD 41 is subjected to the resume-reproduction in the content reproducing system 1. FIG. 6 is a flowchart illustrating a flow of the resume-reproduction processing performed in the flow of the BD-J title reproduction processing according to the embodiment.

In Steps S301 and S302, based on the reproduction information, the play list to be reproduced is identified, and the reproduction start position is decided. The resume-reproduction control unit 33 identifies the play list that was being reproduced last upon the previous reproduction from play list identification information included in the reproduction information read in Step S104 (Step S301), and further decides the reproduction start position within the identified play list based on reproduction position information (information indicating a location in which the reproduction was being performed last upon the previous reproduction) included in the reproduction information (Step S302). More specifically, in the embodiment, in Step S302, the resume-reproduction control unit 33 decides the reproduction position indicated by the reproduction information as the reproduction start position. However, the reproduction start position may be the vicinity of the reproduction position indicated by the reproduction information. For example, the reproduction start position may be possibly set as a position preceding the reproduction position indicated by the reproduction information by a predetermined reproduction time.

In Steps S303 and S304, the resume-reproduction is started. The resume-reproduction control unit 33 instructs the reading unit 22 to read from the BD 41 data necessary to reproduce the play list identified in Step S301 from the reproduction start position decided in Step S302. Then, according to the instruction by the resume-reproduction control unit 33, the reading unit 22 reads the actual picture and sound data and the like recorded on the BD 41 (Step S303). The read data is transferred to the decoder 15, and the reproduction of the content is performed by the reproduction unit 21 (Step S304). In other words, in the resume-reproduction processing illustrated by the flowchart, the play list whose reproduction is controlled originally by the execution of the BD-J program is reproduced without the execution of the BD-J program. After that, the processing advances to Step S305.

Figure 7:
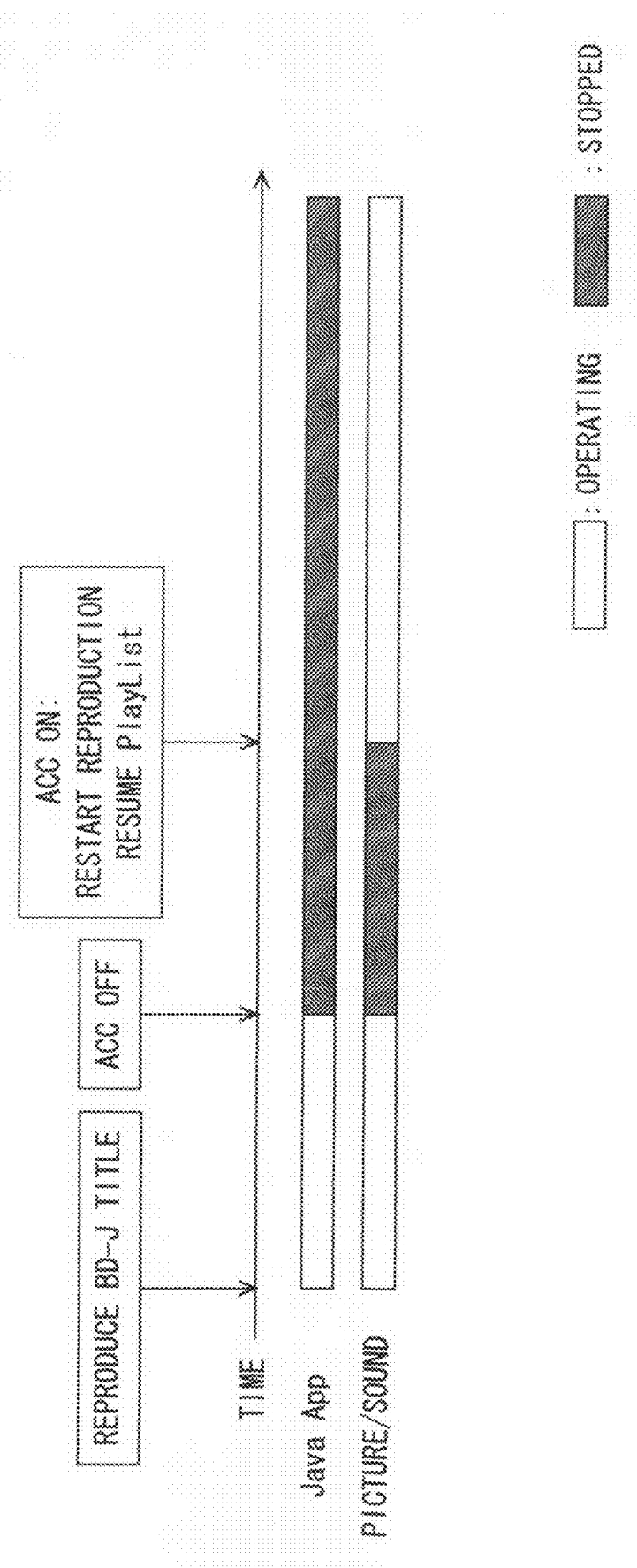
FIG. 7 is a diagram illustrating operation states of a Java (registered trademark) application and a picture/sound in a case where resume-reproduction is performed in the embodiment.

FIG. 7 is a diagram illustrating operation states of a Java (registered trademark) application (BD-J program; abbreviated for reference as "Java App" in the drawing) and a picture/sound (content of the play list) in a case where the resume-reproduction is performed in the embodiment. FIG. 7 illustrates the operation states in the case where the content reproducing system 1 is implemented as the on-vehicle device, and indicates that the BD-J title recorded on the BD 41 is reproduced from "REPRODUCE BD-J TITLE" until "ACC OFF", and that the reproduction is stopped by ACC OFF midway through the reproduction. After that, when the ACC ON operation is performed, the processing illustrated by the flowchart is executed, and the resume-reproduction of the play list is started. Here, according to FIG. 7, it is understood from the description regarding Steps S301 to S304 illustrated in the flowchart that the play list (picture/sound) is reproduced without the execution of the BD-J program (Java (registered trademark) application) that is originally executed for the reproduction control for the content.

In Steps S305 and S306, the recording of the reproduction information is started, and the reproduction is continued up to a play list end point. After the start of the reproduction in Step S304, the reproduction information recording unit 32 starts to record the reproduction information (Step S305). The recording of the reproduction information is substantially the same as the processing described in Step S203 with regard to the normal reproduction processing using the BD-J program, and hence description thereof is omitted. After that, the play list whose reproduction has been started in Step S304 is kept being reproduced until the end point of the play list is reached (Step S306). When the reproduction reaches the end point of the play list, the processing advances to Step S307.

In Steps S307 to S309, if the subsequent BD-J title exists in the Index table, the BD-J title is reproduced in succession to the play list that has reached the end point. The resume-reproduction control unit 33 references the Index table for the BD 41 in response to the fact that the play list subjected to the resume-reproduction reaches the end point in Step S306, and confirms whether or not there is a BD-J title listed subsequently to the BD-J title to which the play list that has reached the end point belongs (Step S307). If there is the subsequent BD-J title in the Index table, the resume-reproduction control unit 33 reads and executes the BD-J program for controlling the subsequent BD-J title (in other words, the subsequent BD-J title is reproduced). Here, the contents of the specific processings for reading and executing the BD-J program and controlling the reproduction of the content are substantially the same as those described in Steps S201 and S202, and hence description thereof is omitted. Note that even if the BD-J title is continuously reproduced, the reproduction information recording unit 32 continues to record the reproduction information stored in Step S305. Further, if the subsequent BD-J title does not exist in the Index table, the reproduction of the BD 41 is brought to an end.

Figure 8:
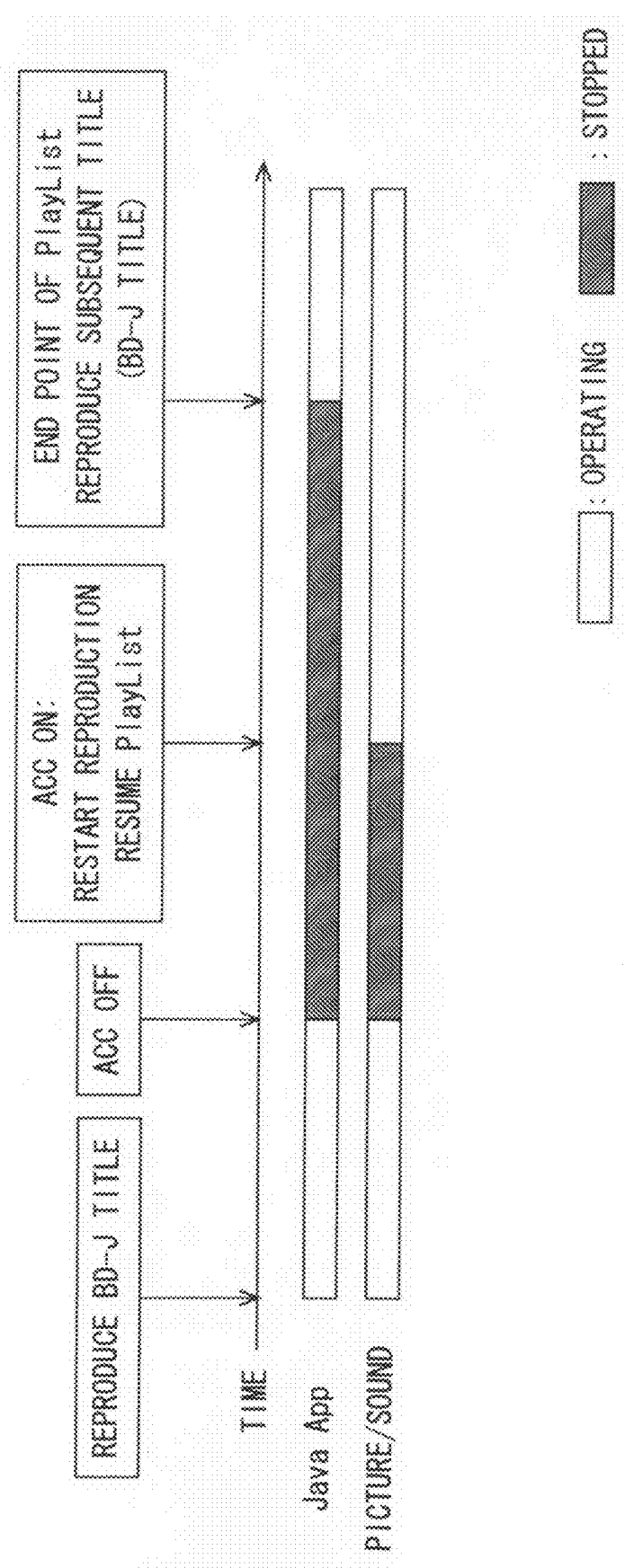
FIG. 8 is a diagram illustrating operation states of the Java (registered trademark) application and the picture/sound in a case where a play list subjected to the resume-reproduction has reached an end point in the resume-reproduction according to the embodiment.

FIG. 8 is a diagram illustrating operation states of the Java (registered trademark) application (BD-J program) and the picture/sound (content of the play list) in the case where the play list subjected to the resume-reproduction has reached the end point in the resume-reproduction according to the embodiment. According to FIG. 8, it is understood from the description regarding Steps S306 to S309 illustrated in the flowchart that when the reproduction of the play list that is not controlled by the BD-J program (Java (registered trademark) application) reaches the end point, the BD-J program (Java (registered trademark) application) for controlling the subsequent BD-J title is executed followed by the start of the reproduction of the subsequent BD-J title.

Figure 9:
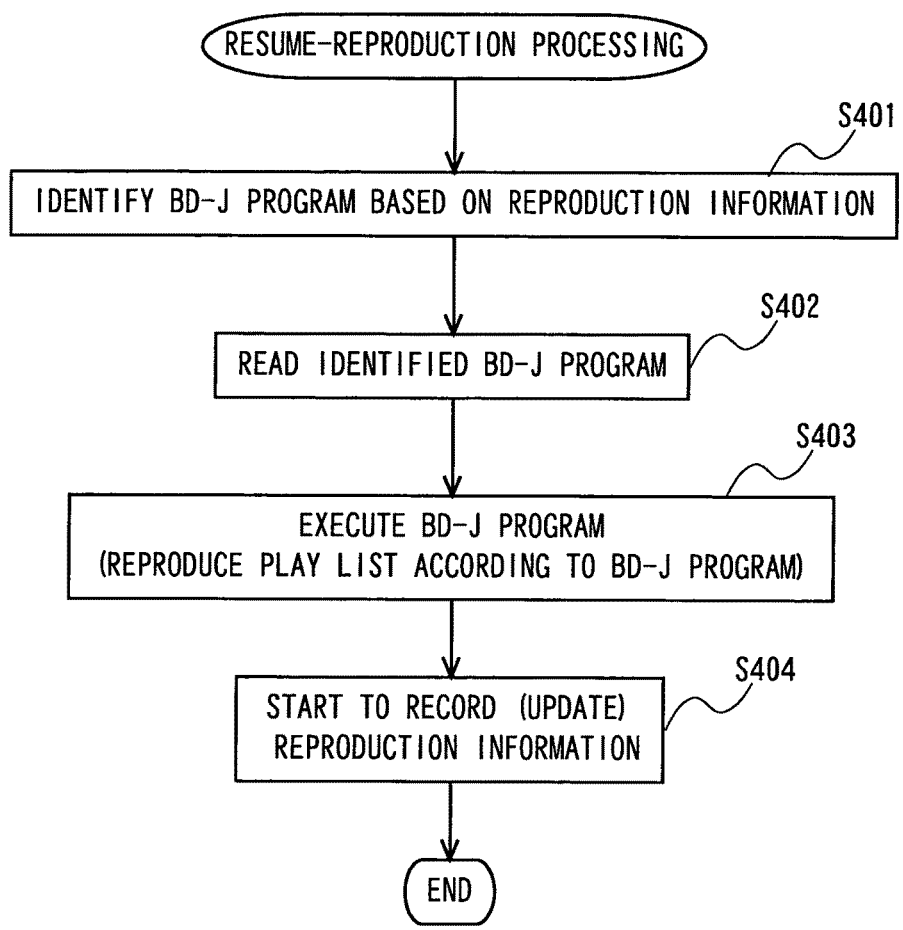
FIG. 9 is a flowchart illustrating a flow of the resume-reproduction processing that can be executed instead of the resume-reproduction processing illustrated in FIG. 6 within the flow of the BD-J title reproduction processing according to the embodiment.

Note that as the resume-reproduction processing according to the embodiment, the resume-reproduction processing described below may be employed instead of the resume-reproduction processing described by using Steps S301 to S309. FIG. 9 is a flowchart illustrating a flow of the resume-reproduction processing that can be executed instead of the resume-reproduction processing illustrated in FIG. 6 within the flow of the BD-J title reproduction processing according to the embodiment.

In Step S401, based on the reproduction information, the BD-J program to be executed is identified. The resume-reproduction control unit 33 identifies the BD-J title that was being reproduced last upon the previous reproduction from the title identification information included in the reproduction information read in Step S104. After that, the processing advances to Step S402.

In Steps S402 and S403, the BD-J program is read, and the execution of the BD-J program is started. The reading unit 22 reads, from the BD, the BD-J program and the content whose reproduction is controlled by the BD-J program, followed by development thereof into the RAM 12 (Step S402). Then, the resume-reproduction control unit 33 starts to control the content reproduction by executing the BD-J program developed in the RAM 12, and performs the resume-reproduction from the BD-J title that was being reproduced last upon the previous reproduction (Step S403). In other words, according to the processing illustrated by the flowchart, the accurate reproduction control can be performed by the execution of the BD-J program, while the reproduction can be performed from the BD-J title that was being reproduced last by skipping the First Playback, the Top Menu, the reproduced title, and the like (see FIG. 2) in the Index table. After that, the processing advances to Step S404.

In Step S404, the recording of the reproduction information is started. The processing for the recording of the reproduction information is substantially the same as that described in Step S203, and hence description thereof is omitted. After that, the recording of the reproduction information is continued until the reproduction of the content is brought to an end.

FIG. 10 is a diagram illustrating operation states of the Java (registered trademark) application (BD-J program) and the picture/sound (content of the play list) in the case where the resume-reproduction is performed in the embodiment. According to FIG. 10, when the ACC ON operation is performed after the stop of the reproduction due to ACC OFF, the processing illustrated by the flowchart is executed, and the resume-reproduction of the play list is started. Here, according to FIG. 10, it is understood from the description regarding Steps S401 to S403 that the play list (picture/sound) is controlled by the executed BD-J program (Java (registered trademark) application).

Note that the content reproducing system 1 includes both the resume-reproduction method that does not involve the execution of the BD-J program which has been described by using FIG. 6 and the resume-reproduction method that involves the execution of the BD-J program which has been described by using FIG. 9, and it may be possible to select any one of the resume-reproduction methods according to the setting contents of the system, the user's selection, and the kind of content. With the arrangement, it becomes possible to perform the resume-reproduction as intended by the user.

For example, the input receiving unit 24 previously receives a selection made by the user's selection received by the input receiving unit 24 via the touch panel display 2, the button, or the like, and causes the setting retaining unit 31 to retain a setting according to a result of the selection. Then, in starting the resume-reproduction control, the resume-reproduction control unit 33 references the setting retained by the setting retaining unit 31 to thereby decide which one of the resume-reproduction methods is to be used to perform the resume-reproduction, and performs the resume-reproduction according to the decided resume-reproduction method. More specifically, the decision of the resume-reproduction method can be made according to whether or not the predetermined setting information indicating any one of the resume-reproduction methods is retained by the setting retaining unit 31.

Further, besides the method of previously receiving the selection made by the user, when the resume-reproduction is to be performed (for example, immediately after Step S103 or S104, which may be another time point), the resume-reproduction method may be selected according to the contents of the setting performed by the user by making an inquiry with a menu of choices presented to the user to cause the user to perform the setting on the resume-reproduction method (contents of the setting are retained in the setting retaining unit 31).

Further, the resume-reproduction method may be automatically selected according to the title reproduction type without depending upon the user's selection. For example, by referencing the title reproduction type read from the BD 41, the resume-reproduction control unit 33 can judge whether or not the BD-J title of the reproduction subject is the interactive-type content. The type of content controlled by the BD-J program includes an interactive type indicating a menu and the like and a movie type indicating actual contents such as a motion picture, and the title reproduction type is information among information recorded on the BD 41, which makes it possible to judge which one of the interactive type and a movie type the title is of. The resume-reproduction control unit 33 discriminates the reproduction type of the content to thereby decide which one of the 2 kinds of resume-reproduction method is used to perform the resume-reproduction.

More specifically, if the title is of the movie type, with regard to such a content, the play list is often reproduced in order in general, and the user makes a possibly large demand for restarting audiovisual viewing from the vicinity of the position in which the user ended the previous audiovisual viewing, and hence the resume-reproduction control unit 33 performs the resume-reproduction by using the resume-reproduction method that does not involve the execution of the BD-J program which has been described by using FIG. 6.

Meanwhile, if the title is of the interactive type, with regard to such a content, the control by the BD-J program is more complicated than that of the movie type, and the user makes a possibly small demand for restarting audiovisual viewing from the vicinity of the position in which the user ended the previous audiovisual viewing, and hence the resume-reproduction control unit 33 performs the resume-reproduction by using the resume-reproduction method that involves the execution of the BD-J program which has been described by using FIG. 9.

However, which one of the resume-reproduction methods is used to perform the resume-reproduction may be selected and decided according to other conditions and factors. By including a plurality of resume-reproduction methods, the content reproducing system 1 according to the embodiment can flexibly provide the user with the resume-reproduction suitable for the situations.

Further, the configuration may be set so that the resume-reproduction is performed by using the resume-reproduction method that does not involve the execution of the BD-J program only if the title is of the movie type, and if the title is of the interactive type, the resume-reproduction is not performed in the first place.

Note that as the resume-reproduction processing according to the embodiment, the resume-reproduction processing described below may be employed instead of the resume-reproduction processing described by using Steps S301 to S309 or Steps S401 to S404. FIG. 11 is a flowchart illustrating a flow of the resume-reproduction processing that can be executed instead of the resume-reproduction processing illustrated in FIG. 6 or 9 within the flow of the BD-J title reproduction processing according to the embodiment.

In Steps S501 to S505, the identification of the play list reproduced based on the reproduction information and the decision of the reproduction start position are performed, and the resume-reproduction and the recording of the reproduction information are started. The detailed contents of the processing illustrated by Steps S501 to S505 are substantially the same as the processing of Steps S301 to S305 described by using FIG. 6, and hence description thereof is omitted. In other words, in the resume-reproduction processing illustrated by the flowchart, the resume-reproduction that does not involve the execution of the BD-J program is first started in the same manner as the resume-reproduction processing illustrated in FIG. 6. After that, the processing advances to Step S506.

In Steps S506 and S507, the BD-J title that was being reproduced last upon the previous reproduction is identified based on the reproduction information, and the BD-J program is read. The detailed contents of the processing illustrated by Steps S506 and S507 are substantially the same as those of the processing of Steps S401 and S402 described by using FIG. 9, and hence description thereof is omitted. In other words, in the resume-reproduction processing illustrated by the flowchart, after the resume-reproduction that does not involve the execution of the BD-J program is started, and simultaneously thereto, the BD-J program related to the BD-J title that was being reproduced last upon the previous reproduction is read. However, at the time point, as illustrated in the Step S504, the BD-J program is not used to control the play list that is actually being reproduced so as to allow the user's audiovisual viewing. After that, the processing advances to Step S508.

In Step S508, the execution of the BD-J program is started. The resume-reproduction control unit 33 starts to control the play list by executing the BD-J program developed in the RAM 12 in Step S507, and performs internal reproduction of the BD-J title that was being reproduced last upon the previous reproduction. However, the picture and the sound related to the control of the BD-J program whose execution has been started in Step S508 are not output to the touch panel display 2. In other words, at the time point, the picture and the sound that are being output to the touch panel display 2 and that are being reproduced so as to allow the user's audiovisual viewing are the picture and the sound related to the resume-reproduction that does not involve the execution of the BD-J program that has been started in Step S504. After that, the processing advances to Step S509.

In Step S509, the execution of the BD-J program is caused to advance until the reproduction position within the play list being reproduced is overtaken. The resume-reproduction control unit 33 executes the BD-J program whose execution has been started in Step S508 so as to advance earlier than the execution for normal reproduction control to thereby cause a reproduction control position by the BD-J program to overtake the reproduction position within the play list whose reproduction has been started in Step S504 and which is being output to the touch panel display 2.

Examples of a method of executing the BD-J program so as to advance earlier than the execution time for the normal reproduction control include: a method of feeding a signal to instruct fast-forward with respect to the reproduction controlled by the BD-J program; and a method of causing the execution of the BD-J program to advance forward without reading the data on the content to be controlled. However, other such method may be employed as the method of executing the BD-J program so as to advance earlier than the execution time for the normal reproduction control. The resume-reproduction control unit 33 compares the reproduction position within the play list that is actually being output to the touch panel display 2 and the reproduction control position controlled by the BD-J program internally (without outputs of the picture and the sound), and causes an execution state of the BD-J program to advance up to a point in which the positions coincide with each other. If the reproduction control position related to the execution of the BD-J program overtakes the reproduction position within the play list being reproduced, the processing advances to Step S510.

In Step S510, output sources are switched over. In response to the fact that the execution of the BD-J program overtakes the reproduction position within the play list being reproduced, the resume-reproduction control unit 33 switches a control entity for the picture and the sound that are being actually output by the reproduction unit 21 to the BD-J program that has been started in Step S508. Here, it is preferable that the switching of the control entity be performed so as to prevent the picture and the sound from being interrupted as much as possible. In other words, a normal BD-J title reproduction is performed in Step S510 and the subsequent steps, and according to the processing illustrated by the flowchart, the user can instantaneously restart the audiovisual viewing from the previous reproduction end position, and by switching to the control by the BD-J program on the midway, can perform the reproduction which is intended by the producer of the content. After that, the processing illustrated by the flowchart is brought to an end.

According to the embodiment, a resume function can be provided even for the BD-J title to which it is difficult to provide the resume function with the same method as the conventional DVD, and the user can be provided with the same convenience as the conventional DVD for the like. Further, with regard to the DVD and the BD that are the same kind of medium for the user, it is possible to avoid the occurrence of indeterminate situations in which the resume is possible or impossible according to the disk, and it is possible to prevent the user attempting to reproduce the BD-J title from erroneously recognizing that a disk fault or a device failure has occurred.

What is claimed is:

1. A content reproducing apparatus, which reads a content from a recording medium on which the content and a BD-J (Blu-ray Disc Java) program for controlling reproduction of the content are recorded and reproduces the content, the content reproducing apparatus comprising:
a content control unit configured to control the reproduction of the content read from the recording medium by reading the BD-J program from the recording medium and executing the BD-J program;
a reproduction information recording unit configured to record reproduction information including a reproduction position within the content during the reproduction;
a reproduction information acquiring unit configured to acquire, upon a start of the reproduction of the content recorded on the recording medium based upon receiving an instruction of starting reproduction, the reproduction information recorded by the reproduction information recording unit when the content recorded on the recording medium is previously reproduced; and
a resume-reproduction control unit configured to start to reproduce the content recorded on the recording medium from the reproduction position identified based on the reproduction information acquired by the reproduction information acquiring unit or from a vicinity thereof without reading and executing the BD-J program,
wherein the content control unit controls the reproduction of the content without requiring further instruction of the starting reproduction when the reproduction information is not acquired by the reproduction information acquiring unit, and the resume-reproduction control unit controls the reproduction of the content when the reproduction information is acquired by the reproduction information acquiring unit, and
the resume-reproduction control unit continues the reproduction of the content recorded on the recording medium by starting execution of the BD-J program read from the recording medium, when the content of which the reproduction is controlled by the resume-reproduction control unit, without reading and executing the BD-J program, reaches an end point.

2. A content reproducing apparatus according to claim 1, wherein the reproduction information recording unit records reproduction information periodically.

3. A content reproducing apparatus according to claim 2, wherein:
the recording medium comprises a recording medium on which a plurality of combinations of the content and the BD-J program for controlling the reproduction of the content are recorded; and
when the content of which the reproduction is controlled by the resume-reproduction control unit reaches the end point, the resume-reproduction control unit continues the reproduction of the content recorded on the recording medium by starting execution of a BD-J program which is included in the BD-J programs recorded on the recording medium and which controls a content subsequent to the content that has reached the end point.

4. A content reproducing apparatus according to claim 1, further comprising a setting retaining unit configured to retain setting contents related to the reproduction control for the content, wherein:

the reproduction information recording unit records the reproduction information including information that allows identification of the BD-J program that controls the content during the reproduction; and
the resume-reproduction control unit is configured to:
start, if a predetermined setting information is not retained by the setting retaining unit, to reproduce the content recorded on the recording medium from the reproduction position identified based on the reproduction information or from the vicinity thereof; and
cause, if the predetermined setting information is retained by the setting retaining unit, the BD-J program executed last upon the previous reproduction, which is identified based on the reproduction information, to be read and executed, to thereby cause the reproduction of the content controlled by the BD-J program to be started from a start point thereof.

5. A content reproducing apparatus according to claim 4, further comprising
a user's selection receiving unit configured to receive a selection made by a user under a scheme for resume-reproduction control by the resume-reproduction control unit,
wherein the setting retaining unit retains the predetermined setting information if the user's selection receiving unit receives the selection under a resume scheme using the BD-J program.

6. A content reproducing apparatus according to claim 1, wherein:
the reproduction information recording unit records the reproduction information including information that allows identification of the BD-J program that controls the content during the reproduction; and
the resume-reproduction control unit starts to execute the BD-J program executed last upon the previous reproduction, which is identified based on the reproduction information, and to reproduce the content recorded on the recording medium from the reproduction position identified based on the reproduction information or from the vicinity thereof, and at a time point when the reproduction position within the content of which the reproduction has been started is overtaken by an execution position within the BD-J program, causes the BD-J program to start to control the reproduction of the content.

7. A content reproducing apparatus according to claim 1, wherein:
the content reproducing apparatus is connected to a nonvolatile storage device; and
the reproduction information recording unit records the reproduction information into the nonvolatile storage device.

8. A content reproducing method, which causes a content reproducing apparatus which reads a content from a recording medium on which the content and a BD-J (Blu-ray Disc Java) program for controlling reproduction of the content are recorded and reproduces the content, to execute:
controlling, by content controlling, the reproduction of the content read from the recording medium by reading the BD-J program from the recording medium and executing the BD-J program;
recording reproduction information including a reproduction position within the content during the reproduction;
acquiring, upon a start of the reproduction of the content recorded on the recording medium based upon receiving an instruction of starting reproduction, the reproduction information recorded in the recording when the content recorded on the recording medium is previously reproduced; and starting to reproduce, by the resume-reproduction controlling, the content recorded on the recording medium from the reproduction position identified based on the reproduction information acquired in the acquiring or from a vicinity thereof without reading and executing the BD-J program, wherein the content controlling involves controlling the reproduction of the content without requiring further instructions of the starting reproduction if the reproduction information is not acquired in the acquiring step, and the resume-reproduction controlling includes controlling the reproduction of the content if the reproduction information is acquired in the acquiring step, and continuing the reproduction of the content recorded on the recording medium by starting execution of the BD-J program read from the recording medium, when the content of which the reproduction is controlled by the resume-reproduction control unit, without reading and executing the BD-J program, reaches an end point.

9. A content reproducing method according to claim 8, wherein:

the content reproducing apparatus further executes retaining setting contents related to the reproduction control for the content;

the recording step includes recording the reproduction information including information that allows identification of the BD-J program that controls the content during the reproduction; and the resume-reproduction controlling step includes starting, if a predetermined setting information is not retained in the retaining, to reproduce the content recorded on the recording medium from the reproduction position identified based on the reproduction information or from the vicinity thereof; and causing, if the predetermined setting information is retained in the retaining, the BD-J program executed last upon the previous reproduction, which is identified based on the reproduction information, to be read and executed, to thereby cause the reproduction of the content controlled by the BD-J program to be started from a start point thereof.

10. A non-transitory readable-by-computer recording medium recorded with a content reproducing program, which causes a computer to function as:

a content reproducing unit configured to read a content from the recording medium on which the content and a BD-J (Blu-ray Disc Java) program for controlling reproduction of the content are recorded and reproducing the content;

a content control unit configured to control the reproduction of the content read from the recording medium by reading the BD-J program from the recording medium and executing the BD-J program;

a reproduction information recording unit configured to record reproduction information including a reproduction position within the content during the reproduction;

a reproduction information acquiring unit configured to acquire, upon a start of the reproduction of the content recorded on the recording medium based upon receiving an instruction of starting reproduction, the reproduction information recorded by the reproduction information recording unit when the content recorded on the recording medium is previously reproduced; and a resume-reproduction control unit configured to start to reproduce the content recorded on the recording medium from the reproduction position identified based on the reproduction information acquired by the reproduction information acquiring unit or from a vicinity thereof without reading and executing the BD-J program, wherein the content control unit controls the reproduction of the content without requiring further instruction of the starting reproduction if the reproduction information is not acquired by the reproduction information acquiring unit, and the resume-reproduction control unit controls the reproduction of the content if the reproduction information is acquired by the reproduction information acquiring unit, and the resume-reproduction control unit continues the reproduction of the content recorded on the recording medium by starting execution of the BD-J program read from the recording medium, when the content of which the reproduction is controlled by the resume-reproduction control unit, without reading and executing the BD-J program, reaches an end point.

11. A non-transitory readable-by-computer recording medium recorded with the content reproducing program according to claim 10, further causing the computer to function as a setting retaining unit configured to retain setting contents related to the reproduction control for the content, wherein:

the reproduction information recording unit records the reproduction information including information that allows identification of the BD-J program that controls the content during the reproduction; and the resume-reproduction control unit is configured to:

start, if a predetermined setting information is not retained by the setting retaining unit, to reproduce the content recorded on the recording medium from the reproduction position identified based on the reproduction information or from the vicinity thereof; and cause, if the predetermined setting information is retained by the setting retaining unit, the BD-J program executed last upon the previous reproduction, which is identified based on the reproduction information, to be read and executed, to thereby cause the reproduction of the content controlled by the BD-J program to be started from a start point thereof.

12. A content reproducing method according to claim 8, wherein the reproduction information records reproduction information periodically.

13. A non-transitory readable-by-computer recording medium recorded with the content reproducing program according to claim 10, wherein the reproduction information recording unit records reproduction information periodically.

* * * * *